H. D. KELLY.
COFFEE URN.
APPLICATION FILED AUG. 7, 1912.
1,189,577.  Patented July 4, 1916.
Fig. 1.
Fig. 2.
Fig. 3.
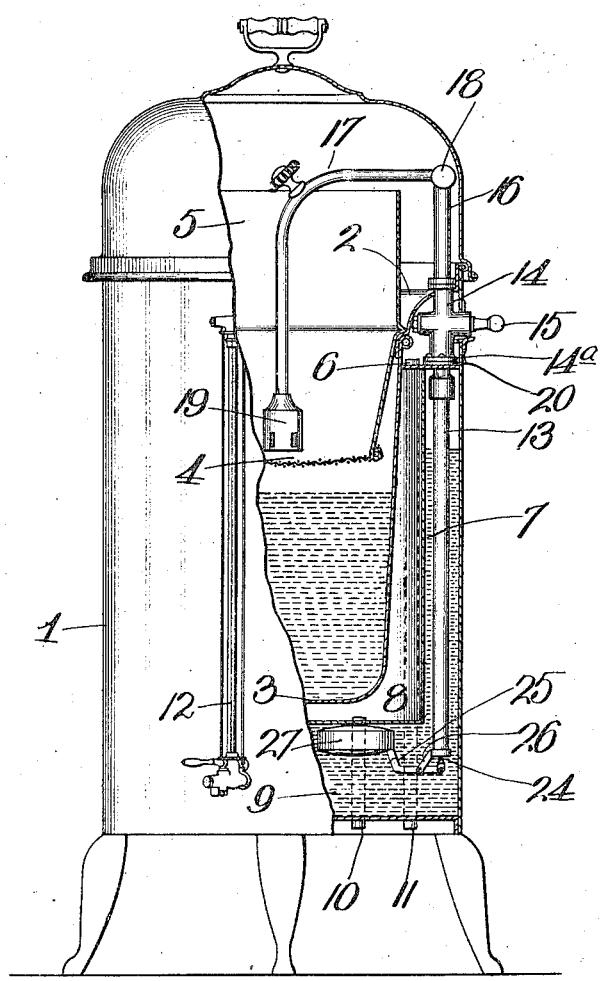
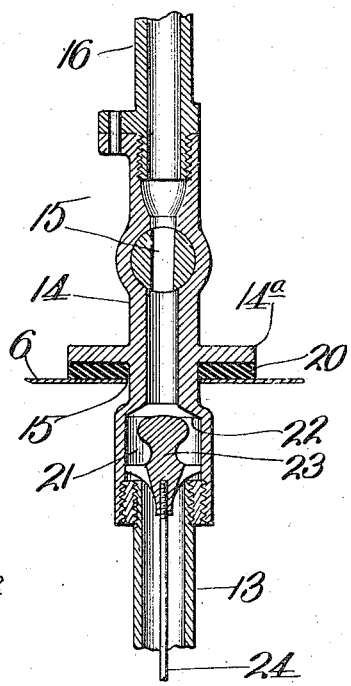
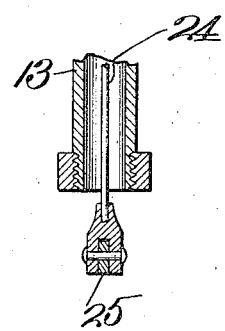
Witnesses
Frank R Glore
M. K. Preston
Inventor
H. D. Kelly.
By George F Thorpe Atty.

UNITED STATES PATENT OFFICE.

HENRY D. KELLY, OF KANSAS CITY, MISSOURI.

COFFEE-URN.

1,189,577.

Specification of Letters Patent.

Patented July 4, 1916.

Application filed August 7, 1912. Serial No. 713,779.

*To all whom it may concern:*

Be it known that I, HENRY D. KELLY, a citizen of the United States, residing at Kansas City, in the county of Jackson and State of Missouri, have invented certain new and useful Improvements in Coffee-Urns, of which the following is a specification.

This invention relates to coffee urns, and has for its object to produce means for automatically shutting off the passage of water from the water chamber of an urn to the coffee jar to guard against accidental production of an undesirably weak beverage or any chance of the flooding of the coffee jar and the drainage of the overflow down upon the table or other support for the urn, a further object being to guard against the scattering of ground coffee suspended over the urn by the injection of steam into the mass of ground coffee and to guard against the spoiling of the beverage through the boiling thereof under the superheating action of steam entering the urn.

With these general objects in view, the invention consists in certain novel and peculiar features of construction and organization as hereinafter described and claimed; and in order that it may be more clearly understood reference is to be had to the accompanying drawing, in which:—

Figure 1, is a view partly in side elevation and partly in vertical section, of a coffee urn equipped with an automatic shut off embodying my invention. Fig. 2, is an enlarged vertical section of a part of the shut-off mechanism. Fig. 3 is a similar view of another part of said mechanism.

In the said drawing, 1 is a coffee urn of any suitable or preferred type, 2 is a ring secured in the upper part of the urn, 3 is a downwardly-tapering coffee jar, and suspended within said jar from ring 2, is a removable receptacle 4 for ground coffee, the receptacle being of such character that liquid can readily pass through it down into the jar, and said receptacle is preferably provided with an upwardly-projecting extension 5, as customary in coffee urns.

6 is a horizontal ring partition dividing the urn externally of the jar, into an upper and a lower chamber. The internal diameter of the ring is less than the external diameter of the jar at the upper end thereof, and the latter is supported by fitting with a steam-tight relation in said ring, through which it depends for almost its full length.

Inclosing the jar is a cylindrical partition 7, having a closed lower end or bottom, said partition dividing the urn into a hot air chamber 8, and a water chamber 9, wherein the water for making coffee is boiled and steam is generated.

10 is a drain tube extending from chamber 8 to the bottom of the urn to carry off the water of the condensation. In the urns heretofore used, this drain tube is to effect the removal of liquid coffee which overflows the jar at times, or rather to assist in the removal of such overflow, as some of it escapes through the hot air flues 11, which flues are common in urns of this character for the purpose of more quickly raising the water in chamber 9, to the boiling point, a burner or other heating appliance (not shown) being ordinarily employed to heat the water and maintain it at the required temperature.

12 is a water gage communicating at its upper and lower ends with the corresponding ends of the water chamber in the usual manner, the water gage being for the purpose of indicating the level of the water in chamber 9.

The parts for conducting water from the water chamber to the coffee jar comprise a pipe 13 arranged vertically in the water chamber, a valve casing 14, above the partition 6, provided with a valve 15, a pipe 16 extending upward from and forming a continuation of the valve casing, and an angular pipe 17 hinged in any suitable manner at 18, to the upper end of pipe or extension 16, and provided at its lower end with a nozzle 19 for discharging boiling water into ground coffee (not shown) in the receptacle 4.

A pipe arrangement of the character described is common in coffee urns, and my invention resides in equipping the same with an automatic shut-off mechanism whereby the passage of water up through the pipes under the pressure of steam in the upper part of chamber 9, shall be automatically cut off to prevent overcharging the jar with liquid coffee, and to prevent the passage of steam up through pipe 13, and the injection through its connections, of steam into the mass of ground coffee in receptacle 4. It is obvious that such injection would result in scattering the coffee in an objectionable manner and in weakening the beverage through the flow of condensed steam into the urn. The greatest objection however to the access of steam to the ground coffee is that the steam would boil the coffee beverage and thereby spoil the same by making it bitter. Where coffee is made in large quantities as in urns of the character of this application it is decidedly objectionable to have the coffee beverage boil.

The valve casing 14 is provided with a flange 14ª above partition 6, and a washer 20, is interposed between said flange and the said partition, to produce a liquid-tight joint whereby it will be impossible for steam to pass from the water chamber to the chamber above said partition 6.

In my construction, the lower end of the valve casing 14 is enlarged to provide a valve chamber 21 and a downwardly-facing valve seat 22, and fitting in said chamber is a valve 23, mounted upon the upper end of a rod 24 projecting beyond the lower end of pipe 13, and at such end, pivoted to one end of a lever 25, fulcrumed on an arm 26, rigid with the pipe 13, and secured to the opposite end of said lever 25 is a float 27, which is normally held by the water adjacent to the bottom of partition 7, and at such time the valve 23 is unseated, as shown in Fig. 2. When the water level in the urn falls below the float, the latter moves downward and through the lever and rod, closes valve 23 upon its seat 22 and thus arrests the passage of water and prevents steam from obtaining access to the ground coffee and to the beverage in the urn.

In practice, an urn of this character will preferably contain about twice as much water as the jar, and hence it is possible for the jar to be overcharged with the parts proportioned substantially as shown unless means are provided, such as contemplated by this invention, for automatically shutting off the flow of water from the water chamber to the jar.

When it is desired to make coffee in receptacle 4, the attendant simply opens valve 15, and the steam in the upper part of the water chamber, causes the water to flow up through the pipes, as described, into the ground coffee receptacle for the purpose of extracting the strength from the coffee and entering the jar as liquid coffee. When sufficient coffee has been made,—the attendant determining this by inspection of the gage,—the valve 15 is closed. If the attendant forgets to close the valve of the ordinary urn, the water will continue to flow from the water chamber into the jar until the coffee overflows from the jar, some of the overflow entering the chamber 8 and draining down upon the urn support, and some of it usually escaping by way of the flues 11. With my equipment, this overflow is impossible as the float is so arranged that it closes valve 23 before the jar is fully charged, it being, of course, understood that the water capacity of the urn above the level of the float is slightly less than the capacity of the jar. The water capacity of the urn above the lower end of the pipe 13, is in excess of the capacity of the jar, because at times it is desired to make an additional supply of coffee in the jar before any additional water is supplied to the urn.

If it is desired, at any time, to make a quantity of coffee less than the capacity of the jar and have the water supply cut off automatically so as to avoid the necessity of the attendant keeping the gage under observation, it can be accomplished if the level of water in the water chamber stands in the gage at a height corresponding to the amount of coffee which it is desired to make, that is to say, if it is desired to make three gallons of coffee, the quantity of water above the float must not exceed three gallons, so that when that quantity has been discharged into the jar, the float will automatically close the valve 23.

From the above description it will be apparent that I have produced a coffee urn embodying the features of advantage enumerated as desirable in the statement of the object of the invention and which may be changed in minor particulars without departing from the spirit and scope of the invention as defined in the appended claim.

I claim:

A coffee urn having a boiler, a coffee vessel suspended within said boiler, a pipe having one end submerged in the water of the boiler and its other end positioned to discharge water into said vessel, said pipe having a valve for closing the passage therethrough when the water in the boiler lowers to a given level, a float pivotally carried by the lower end of said pipe and normally held by the water against the bottom of said vessel, and connections between said valve and float whereby the latter will operate automatically to close the former as the float lowers with the water to said level.

In testimony whereof I affix my signature, in the presence of two witnesses.

HENRY D. KELLY.

Witnesses:
G. W. DUVALL,
G. Y. THORPE.